(12) United States Patent
Chamberlin et al.

(10) Patent No.: US 8,286,570 B2
(45) Date of Patent: Oct. 16, 2012

(54) HULL FOR A MARINE VESSEL

(76) Inventors: Kim Chamberlin, Altona (AU); Robin Chamberlin, Riverside (AU); Ark Chamberlin, Altona (AU)

( * ) Notice: Subject to any disclaimer, the term of this patent is extended or adjusted under 35 U.S.C. 154(b) by 77 days.

(21) Appl. No.: 12/994,104

(22) PCT Filed: May 22, 2009

(86) PCT No.: PCT/AU2009/000642
§ 371 (c)(1),
(2), (4) Date: Dec. 23, 2010

(87) PCT Pub. No.: WO2009/140739
PCT Pub. Date: Nov. 26, 2009

(65) Prior Publication Data
US 2011/0162572 A1    Jul. 7, 2011

(30) Foreign Application Priority Data
May 22, 2008    (AU) ................................ 2008902535

(51) Int. Cl.
*B63B 1/00*    (2006.01)
(52) U.S. Cl. .................................... 114/61.2; 114/61.21

(58) Field of Classification Search ................ 114/61.1, 114/61.2, 61.21, 274
See application file for complete search history.

(56) References Cited

U.S. PATENT DOCUMENTS

| | | | | |
|---|---|---|---|---|
| 2,464,957 | A | * | 3/1949 | Wood ......................... 114/61.21 |
| 3,590,765 | A | * | 7/1971 | De Lizasoain .............. 114/77 A |
| 3,763,810 | A | | 10/1973 | Payne |
| 3,776,168 | A | | 12/1973 | Weeks |
| 4,452,166 | A | * | 6/1984 | Daniel ......................... 114/282 |
| 1,935,622 | A | | 11/1993 | Eddy |
| 5,503,100 | A | | 4/1996 | Shaw |
| 6,131,529 | A | | 10/2000 | Smith |

FOREIGN PATENT DOCUMENTS

| | | |
|---|---|---|
| DE | 10300599 | 7/2004 |
| GB | 792317 | 3/1958 |
| WO | WO 2007/023215 | 3/2007 |
| WO | WO 2009/140739 | 11/2009 |

\* cited by examiner

*Primary Examiner* — Stephen Avila
(74) *Attorney, Agent, or Firm* — John F. Letchford; Archer & Greiner, P.C.

(57) ABSTRACT

A hull (1) for a marine vessel (10) comprising an elongate body (2) that tapers outwardly from a foremost location, the bow (3), and tapers inwardly toward the aft (4) such that the aft (4) of the body (2) is significantly reduced in profile with respect to a point in the hull at which the inward taper commences.

20 Claims, 11 Drawing Sheets

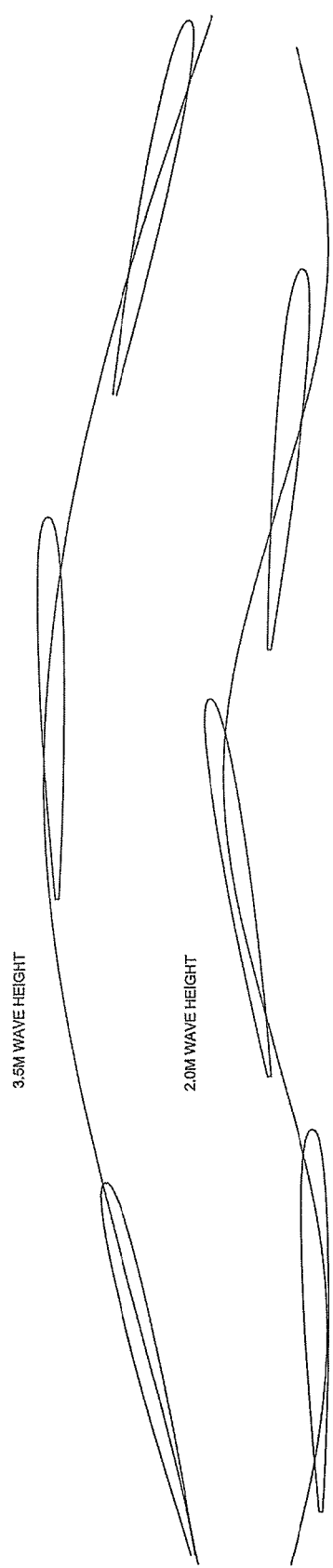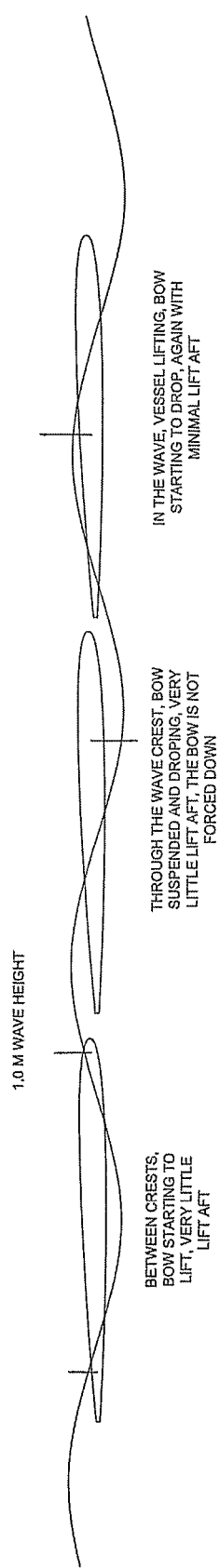
Figure 6
Figure 5
Figure 4

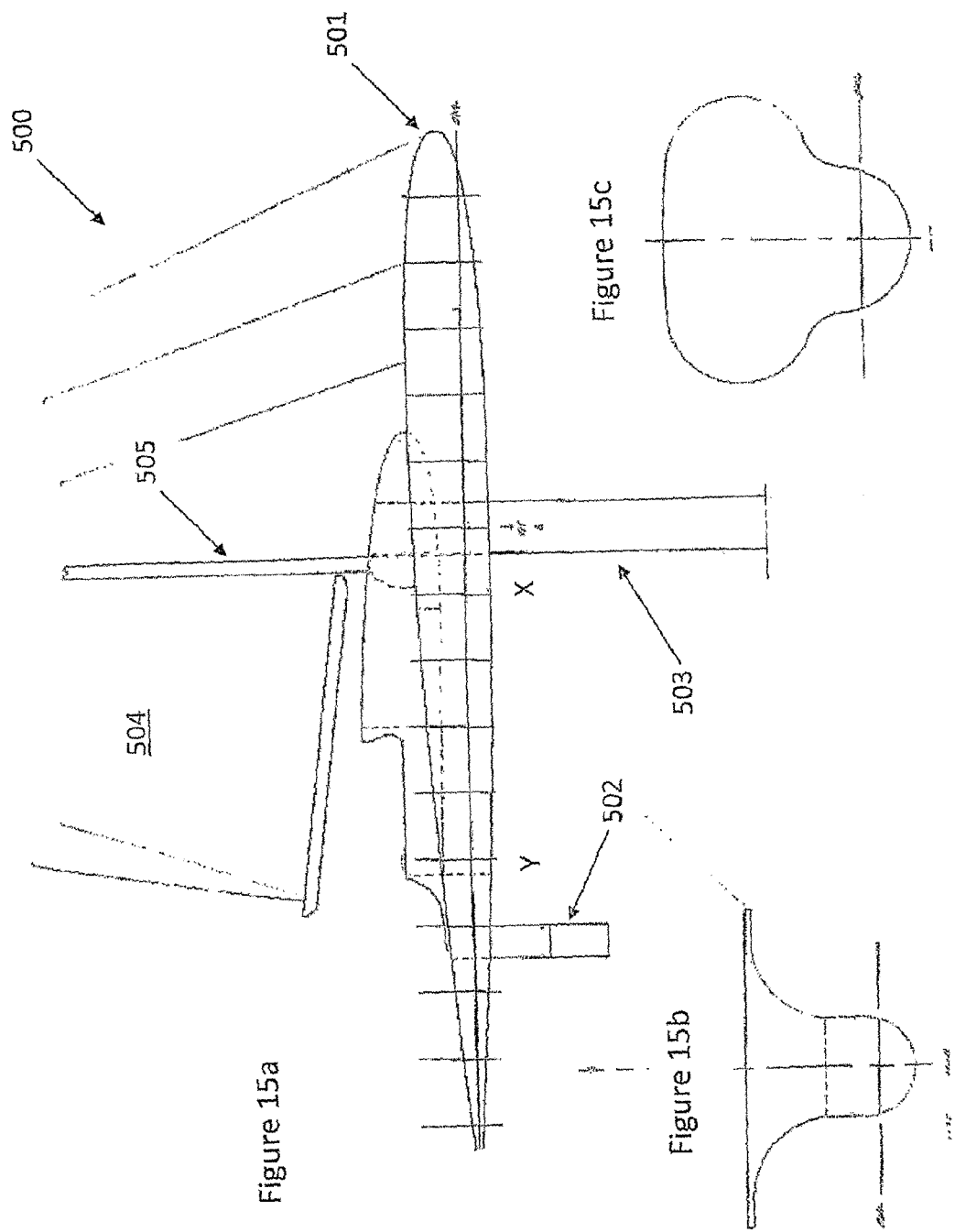

US 8,286,570 B2

HULL FOR A MARINE VESSEL

FIELD OF THE INVENTION

This invention relates to hulls for a marine vessel, and in particular hulls which can be suitable for marine vessel such as a monohull, catamaran, trimaran, sailing yacht, powered vessel, pleasure craft, commercial vessels or military vessels.

BACKGROUND TO THE INVENTION

Rising oil prices and increasing environmental awareness in recent years have fuelled a demand for more efficient high speed marine transport. A large division exists between slow speed, efficient marine transport and faster, less economical modes of moving cargo such as aviation. Although high speed marine vehicles are currently in operation they suffer from the effects of lower efficiency and an inability to carry large payloads due to the required power to weight ratio.

When used for the carriage of passengers, high speed marine vehicles also have the disadvantages of reduced seakeeping abilities. Current high speed vessels have higher dynamic loadings and larger accelerations, which often limit their operation to conditions of less severity. This reduces the reliability of service of these vessels and often restricts them from operation on large open water routes.

Accordingly, it is an object of the present invention to provide a hull for a marine vessel with improved seakeeping and resistance characteristics.

SUMMARY OF THE INVENTION

In accordance with the invention there is provided a hull for a marine vessel, the hull including an elongate body that tapers substantially continuously outwardly from a foremost location to a middle section with a maximum beam and tapers substantially continuously inwardly from the middle section toward the aft such that the aft of the body is significantly reduced in profile with respect to the maximum beam, and the hull having at least a foremost section with an enclosed structure and the elongate body having a centre of buoyancy in the forward half.

The elongate body can have a first buoyancy portion that is generally submerged during quiescent sea conditions to provide sufficient buoyancy to maintain the vessel afloat; and a second buoyancy portion located above the first buoyancy portion and providing additional buoyancy upon further submersion of at least the foremost section of the hull.

The first buoyancy portion and for the second buoyancy portion can be generally foil shape.

The foremost section of the hull can be shaped as a volume of revolution about a central longitudinal axis.

A hull for a marine vessel of the invention has the hull with a length to beam ratio of between 10:1 and 18:1.

A hull for a marine vessel for use in supporting a superstructure can have the ratio of the length of the hull to the length of the superstructure is over 130% whereby the extension of the hull beyond the superstructure creates a larger moment and the mass moment of inertia of the vessel is more centralized and stable.

According to an aspect the present invention provides a hull for a marine vessel, the hull comprising an elongate body that tapers outwardly from a foremost location and tapers inwardly toward the aft such that the aft of the body is significantly reduced in profile with respect to a point in the hull at which the inward taper commences, the elongate body having: (a) a first buoyancy portion that is generally submerged during quiescent sea conditions to provide sufficient buoyancy to maintain the vessel afloat; and (b) a second buoyancy portion located above the first buoyancy portion and providing additional buoyancy upon further submersion of the hull; and wherein the second buoyancy portion is distributed along the length of the hull such that the centre of buoyancy is located at a position from 40% to 35% of the overall length of the hull from the foremost location depending on the extent to which the hull is submerged.

The seakeeping abilities of the hull are controlled by the volume and distribution of the second buoyancy portion. Generally speaking, the second buoyancy portion is located generally forwardly along the length of the hull to provide the forward location of the centre of buoyancy. Such location, in combination with the forward and rear tapering enables the hull generally to ride over the swell of the water and, in uneven seas, to pierce smaller waves, thereby providing a smoother ride.

In the event that waves are pierced, the volume and distribution of the second buoyancy portion affects the buoyancy force for returning the hull to the surface of the water.

Further, the forward location of the centre of buoyancy from 40% to 35% of the overall length provides stability for the vessel. A rearward shift in the centre of buoyancy is undesirable because it causes the bow of the vessel to slam against the surface of the water as the wave crest passes a rear portion of the hull.

The inward taper towards the aft causes the rear portion of hull to be submerged in the wave crest so that the vessel is less susceptible to severe vertical movement of the bow, and therefore, less susceptible to slamming.

Longitudinal sections of the hull can be submersible in the event the hull pierces a sufficiently large wave. Preferably, the hull is completely submersible.

In the unlikely event that the hull is completed submerged, the buoyancy force reaches a maximum so further submersion does not increase the buoyancy further, that is, a constant buoyancy force. The constant buoyancy force provides for smoother sailing in heavy seas and also decreases the risk of structural damage to the vessel. The buoyancy that has been created will continue to act to restore the vessel to the surface and that when completely submerged the centre of buoyancy can be 40-35% aft of the bow, hence the vessel will rise bow first. This is in contrast to conventional displacement hulls where the buoyancy forces increase with increased submersion. In such cases the centre of buoyancy can shift aft and cause increased rebound as the buoyancy force pushes the hull out of the water causing great discomfort for passengers. Rising bow first provides a more comfortable ride for passengers.

In an embodiment, the centre of buoyancy is located at a position of 37% from the overall length of the hull from the foremost location when the hull is fully submerged.

The profile of the hull can be formed such that the buoyancy increases with increasing submersion of the hull and the buoyancy increases at a decreasing rate when submerged vertically from its axis of symmetry.

The second buoyancy portion can have a vertical profile that includes a taper such that buoyancy increases at a diminishing rate as that taper is submerged.

The second buoyancy portion of the hull limits the buoyancy force so that the "pitch" (i.e. the rotation about a transverse axis), "heave" (i.e. the vertical motion of a vessel) or "surge" (i.e. the longitudinal motion of the vessel) exerted by the buoyancy, is reduced in comparison to conventional hulls. The overall effect is that the seakeeping of the hull involves less severe upward buoyancy heaves and diminished surges so the ride is more comfortable. Further, the limited surge reduces the added resistance in waves and hence the vessel is more efficient in a seaway.

In a one embodiment, the hull has a circular or elliptical cross-section. In another embodiment, the hull can have a more conventional form whilst still using similar volumes and distribution of the first and second buoyancy distributions.

In an embodiment, the first and second buoyancy portions are shaped to provide 0-3° bow trim. The preferred bow trim in 1°.

The hull can further include means for controlling the dynamic trim of the hull which can be a foil which can be T-shaped. Alternatively, trim can include wing foils attached to the hull or deflecting strakes.

The hull can further comprise any one or more of the following deflectors or control surfaces:
(i) a spray deflector for deflecting water spray from the bow;
(ii) spray deflectors extending longitudinally along the hull above the waterline or at discrete locations along the hull;
(iii) deflectors located on the first buoyancy portion for enhancing seakeeping at speeds greater than 10 knots;
(iv) side-slip controller located in the forward and/or aft longitudinal 30% of the hull;
(v) transverse steps located in the aft 40% of the hull for inducing aeration.

Preferably, the deflectors or control surfaces do not alter the volume or distribution of the first or second buoyancy portion.

The hull can be shaped as a volume of revolution about a central longitudinal axis.

The volume of revolution can be defined by rotating a foil shape about the central longitudinal axis.

According to a second aspect, the present invention provides a marine vessel including:
(a) one or more hulls according to a first aspect;
(b) propulsion means; and
(c) means for controlling the direction of travel of the vessel.

The hull can be connected to a structure for accommodating passengers or cargo. In one embodiment the hull can be connected to the structure by support means.

In one embodiment, the support means comprises one or more struts. The struts can be shaped to reduce hydrodynamic resistance imparted when at least part of the strut or struts are submerged. It will also be appreciated that any form of solid material attachable to the hull, and altering the shape of the hull, can be used as support means. Preferably, such an attachment would be approximately 30% or less of the hull's width.

Preferably, the support means comprises a member defining an enclosed volume that contributes to buoyancy when at least partly submerged.

The propulsion means can be motorized. The motorized propulsion means can include an engine and a propeller driven by the engine, the propeller being arranged to be submerged when the vessel is located in the water.

Alternatively, the propulsion means harnesses wind power.

BRIEF DESCRIPTION OF THE DRAWINGS

A preferred embodiment of the invention will now be described, by way of example only, with reference to the accompanying drawings, in which:

FIG. 4 is a side view of a hull shown in FIG. 1 piercing through small chop.

FIG. 5 is a side view of a hull shown in FIG. 1 reacting to a larger chop.

FIG. 6 is a side view of a hull shown in FIG. 1 riding over a large swell.

FIG. 15a is a side view of a monohull sailing vessel using the hull shown in FIG. 1.

FIG. 15b is a cross-section taken at point Y in FIG. 15a.

FIG. 15c is a cross-section taken at point X in FIG. 15a.

DETAILED DESCRIPTION OF AN EMBODIMENT

Figure 2:
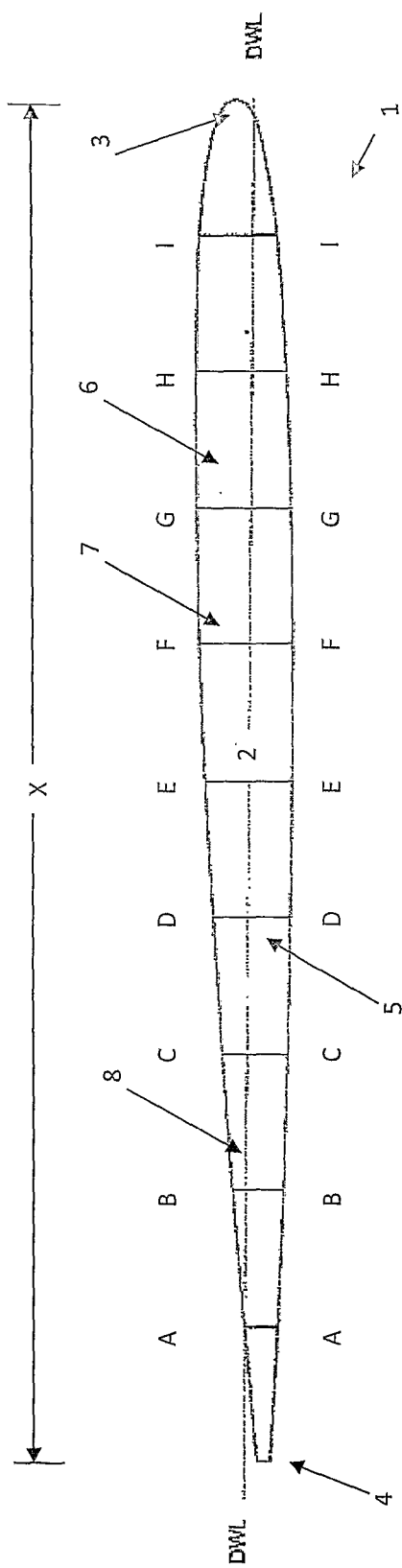
FIG. 2 is a side view of a hull according to the first aspect of the present invention.

A first embodiment of the present invention is shown in FIG. 2. A hull 1 for a marine vessel 10 comprising an elongate body 2 that tapers outwardly from a foremost location, the bow, 3, and tapers inwardly toward the aft 4 such that the aft 4 of the body 2 is significantly reduced in profile with respect to a point in the hull at which the inward taper commences. This can best be seen in FIG. 3 where cross sections of the hull 1 are shown.

The hull has a length to beam ratio of between 10:1 and 18:1. However a particularly preferred hull as shown in FIG. 2 has length to beam ratio of 13:1

The elongate body 2 has a first buoyancy portion, indicated generally by the numeral 5, that is generally submerged during quiescent sea conditions to provide sufficient buoyancy to maintain the vessel afloat; and a second buoyancy portion, indicated generally by the numeral 6 located above the first buoyancy portion 5 and providing additional buoyancy upon further submersion of the hull. The second buoyancy portion 6 is distributed along the length of the hull, X, such that the centre of buoyancy, shown generally in the area of numeral 7, is located at a position from 40% to 35% of the overall length of the hull, X, from the foremost location 3 depending on the extent to which the hull 1 is submerged.

Figure 3:
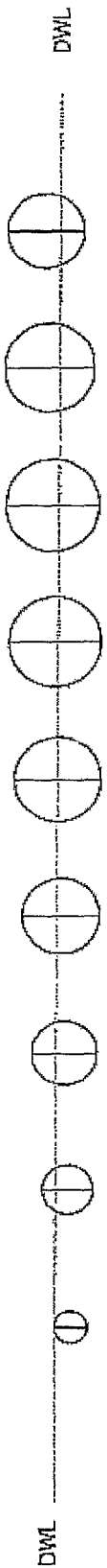
FIG. 3 is a cross-section of the hull along the lines A-A, B-B . . . I-I in FIG. 2.

FIG. 3 indicates the position of the hull 1 in the water when sea levels are quiescent. As is apparent, the cross section of the body 2 is much larger through sections E-E, F-F, G-G and H-H than the remainder of the body. In particular, the cross section line A-A is particularly small when compared with the previous sections.

The present invention shall be described herein in terms of a hull 1 for a catamaran 10 or a trimaran 100. However, it is envisaged that the hull 1 may be modified to be applicable for any other suitable marine vessel. The advantage of this hull 1 is that it can be easily configured to suit high or low speed applications with exceptional efficiency. It is envisaged that the shape, dimensions, style and features of the invention may be varied as required to suit different vessels.

Figure 1:
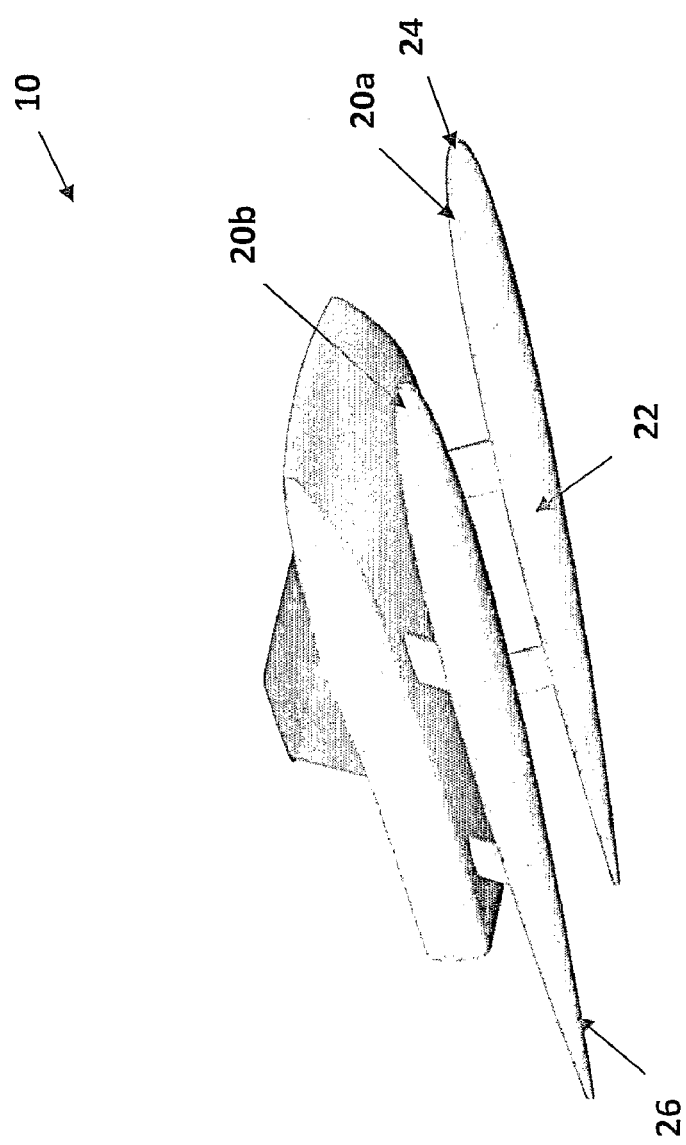
FIG. 1 is a perspective view of a catamaran vessel according to the second aspect of the present invention.
Figure 7:
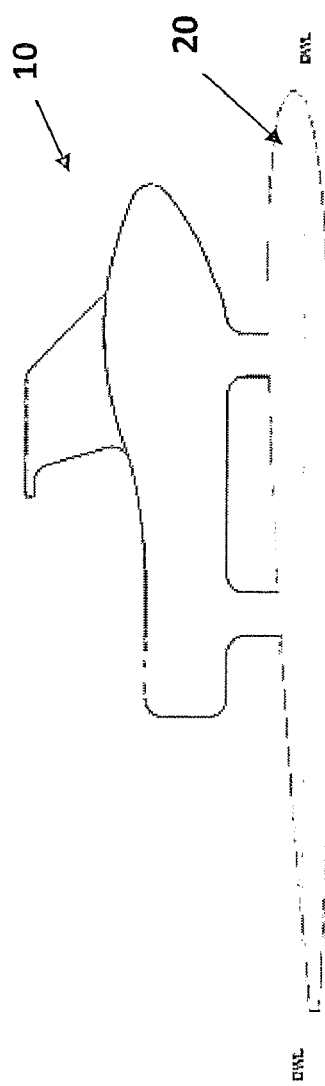
FIG. 7 is a plan view of catamaran vessel shown in FIG. 1.
Figure 8:
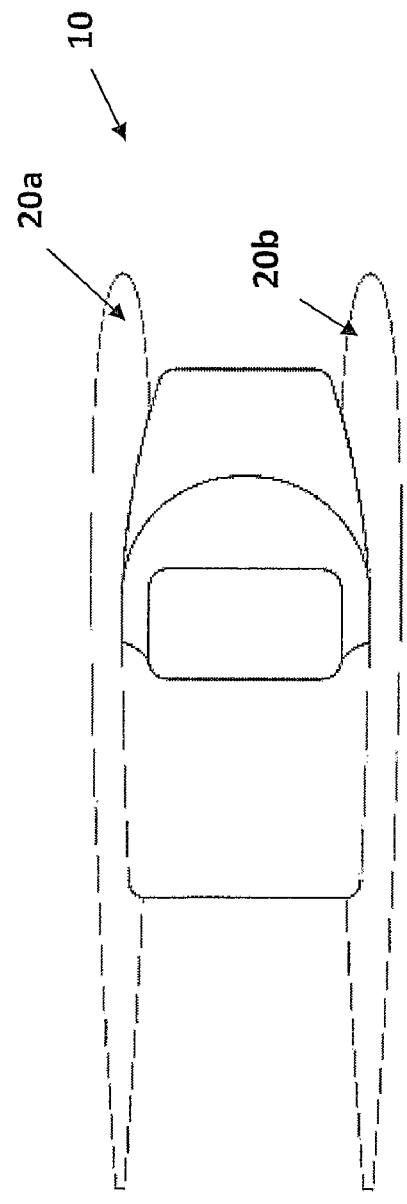
FIG. 8 is side view of the catamaran in FIG. 1.

One embodiment of the present invention for a marine vessel 10 in accordance with the second aspect of the present invention is shown in FIGS. 1, 7 and 8. In a preferred embodiment, the invention provides hulls 20*a* and 20*b* for a marine vessel generally indicated by reference numeral 10. The hulls 20*a* and 20*b* each comprise an elongate body, 22*a* and 22*b* respectively that tapers outwardly from their foremost locations 24*a* and 24*b* and tapers inwardly toward the aft sections 26*a* and 26*b*. The effect of the tapering is described above.

The hull 1 has provided a long cylindrical/elliptical slender body 2 with a specially shaped aft section 4 to produce minimal wave making resistance and provide a clean entry and exit through the water. The aft shape 4 is also designed to reduce adverse pressure gradients, delay flow separation and reduce the wake created by the hull. The body design 2 is adapted to utilise favourable pressure gradients in the forward region and minimise adverse gradients in the rear region. The diameter should be such that the elongate body 2 is slender enough to reduce impact forces to a comfortable level and pierce smaller swell or chop unobtrusively to improve the ride while having the right balance of reserve buoyancy to adjust to heavier conditions. The above water body shape, indicated generally by Y in FIG. 4, is designed to give a gradual shift forward of the centre of buoyancy 7 as the hull 1 is immersed which alters the attitude of the vessel 10, 100. It is envisaged that vessels 10, 100 using the hull 1 of the invention may be provided with a slight bow high trim to give further reserve buoyancy toward the bow.

The hull 1 preferably has provided a long, slender, tapered stern shape that can be cylindrical or elliptical in shape. The front of the body 2, as seen between sections D and foremost point 3 in FIG. 2, is slightly tapered and pointed with a rounded tip 3. The fairbody preferably has a 0.5-1.5 degree bow high trim in a static or dynamic position. The second buoyancy portion 6 is adapted to be forward maximised with the centre of buoyancy 7 moving forward as the hull 1 submerges. The rear of the hull preferably has a more defined taper to a narrow pointed end, as seen in sections A-A through to E-E in FIG. 2, so that the second buoyancy portion 6 is minimised aft. The taper 8 is elongated so the aft reserve buoyancy has a long lever arm from the LCB. In a further embodiment, the aft may have provided a "T" shaped foil for high-speed trim control.

The hull 1 has provided full circular sections, A, B, C, D, E, F, G, H and I, along its length which are designed to ensure that the efficiency of the hull 1 is not compromised when the vessel 10, 100 is heavily loaded. The hull 1 utilises circular cross-sections, to give a similar, comparably efficient underwater shape to the hull 1 at any displacement. At any given draft, the hull 1 will still retain a high efficiency below the water profile resulting in minimal performance loss over its entire operating range. The circular cross-sections, A, B, C, D, E, F, G, H and I, provide balance for the hull 1. The second buoyancy portion 6 of the hull 1 has been designed to be carefully balanced so that it provides the required hydrostatic lift without undesirable accelerations which are often caused by excessive reserve buoyancy.

Figure 11A:
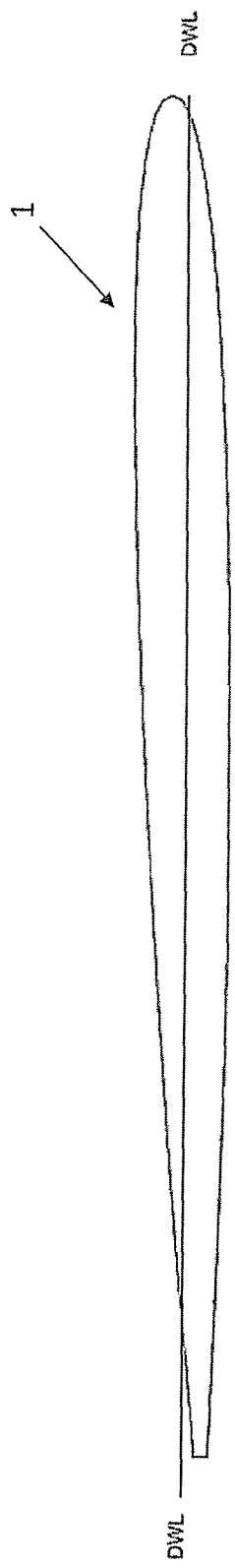
FIG. 11a is a side view of the hull shown in FIG. 1 in a static waterline.
Figure 11B:
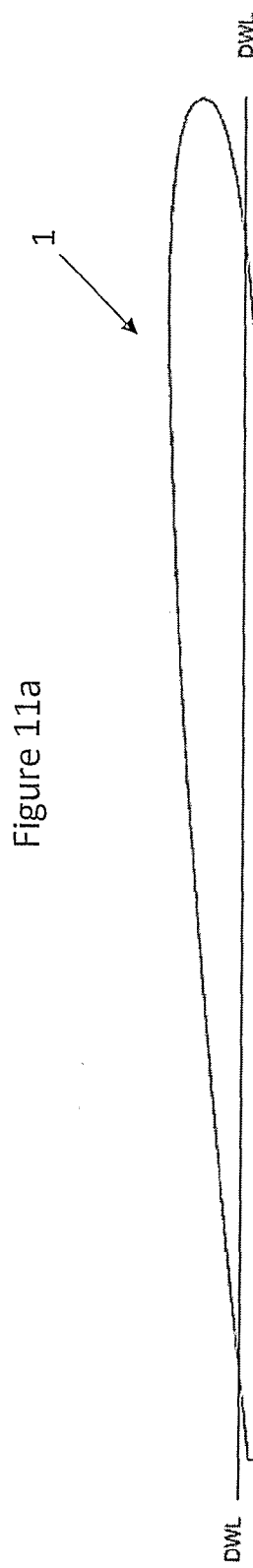
FIG. 11b is a side view of the hull shown in FIG. 1 in moving at mid-speed.
Figure 11C:
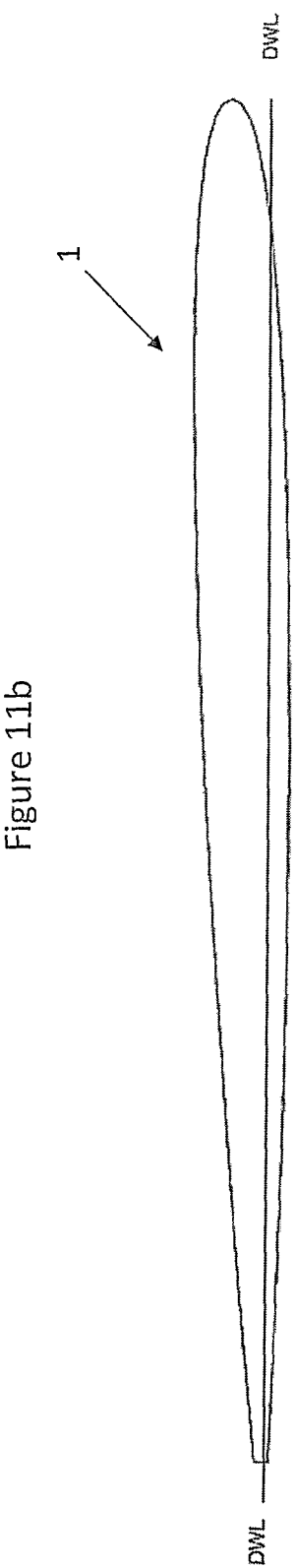
FIG. 11c is a side view of the hull shown in FIG. 1 in moving at high speed.

FIGS. 11*a*, 11*b* and 11*c* show hull 1 in various operational conditions. FIG. 11*a* shows the hull 1 in static water where the hull 1 is supported hydrostatically. There is approximately a one degree bow trim to increase the second buoyancy portion 6. At mid-speed, shown in FIG. 11*b*, the hull 1 is supported by a combination of hydrostatic and hydrodynamic forces. The bow altitude is increased by the lift generated from the forward section of the hull 1. At high speed, shown in FIG. 11*c*, a greater portion of the hull's weight is supported by hydrodynamic forces, but the water trim is closer to that in FIG. 11*a*. The water trim is more like the static trim as the stern breaks from the water to level the hull 1.

Figure 12A:
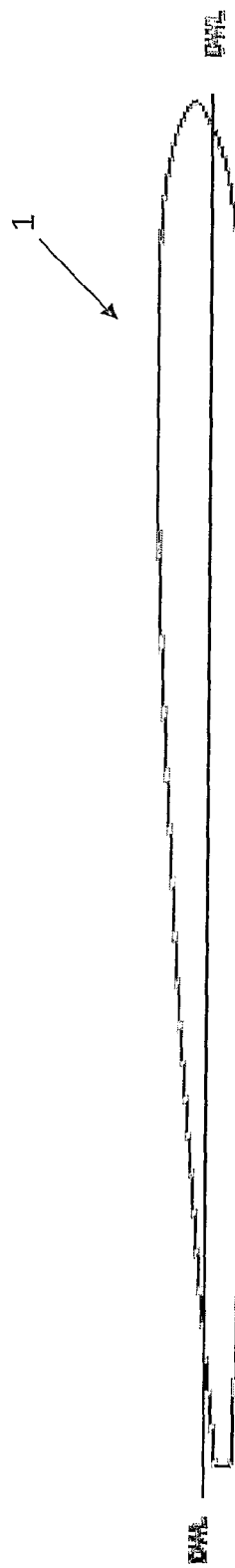
FIG. 12a is a side view of the hull shown in FIG. 1 for higher speeds.
Figure 12B:
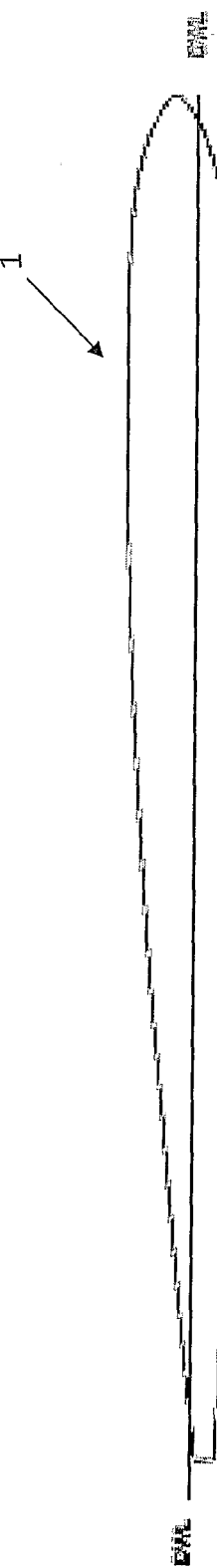
FIG. 12b is a side view of the hull shown in FIG. 1 for carrying medium weight.
Figure 12C:
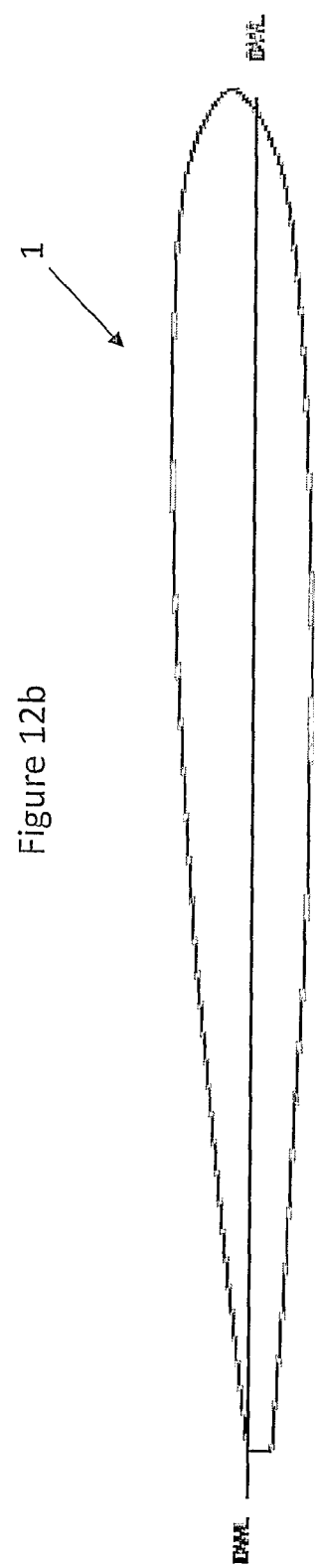
FIG. 12c is a side view of the hull shown in FIG. 1 for carrying heavy loads.

The load to speed ratio is shown in FIGS. 12*a*, 12*b* and 12*c*. The hull in FIG. 12*a* has a larger length to beam ratio and is built for higher operational speeds. With increasing load carrying ability, the length to beam ratio decreases as seen most clearly in FIG. 12*c* where the hull is built for lower operational speed but greater load carrying.

FIGS. 4, 5 and 6 show the hull 1 moving through a one metre wave. When the hull is between crests, the bow 3 begins to lift and there is very little lift aft 4. Once the hull 1 has broken through the crest of the wave, the bow 3 is suspended and drops with minimal lift aft 4. This makes for a calmer ride and the bow 3 is not forced down. In FIG. 6, the vessel is lifting but there is still minimal lift aft 4.

Two embodiments of the present invention are shown in FIGS. 7 to 10. FIGS. 7 and 8 show a catamaran 10 including two hulls 1 (shown in FIG. 2) and marked in FIGS. 7 and 8 as 21*a* and 21*b*.

A hull for a marine vessel for use in supporting a superstructure as shown in FIGS. 7 to 10 preferably has the ratio of the length of the hull to the length of the superstructure being over 130% whereby the extension of the hull beyond the superstructure creates a larger moment and the mass moment of inertia of the vessel is more centralized and stable. The ratio of the length of the hull to the length of the superstructure assists, since if you add mass at the extremities you will increase the mass moment of inertia of the vessel and hence lose some of the benefits gained by having the hull protruding and applying a larger moment. Also if the bow of the superstucture protrudes too far it will begin impacting with the water before the buoyancy in the hulls make the vessel ride over the wave. However you could make the superstructure longer and still utilise the basic principles of the hull form.

A separate pod 28 is positioned between two hulls 21*a* and 21*b* above the waterline, and connected by struts 32. The struts 32 and pod 28 prevent water being trapped between the hulls, reducing slamming loads caused by water or air passing between two perpendicular hulls 21*a* and 21*b*. Any form of propulsion can be used in conjunction with the catamaran 10.

The pod 28 can also be used to counteract and steady the vessel 10 if it pushed beyond its limits and driven into the base of a swell at high speeds. Also a conventional straight shaft arrangement could be utilized whereby the propeller is protected by a skeg attached to the lower portion of the hull. For larger vessels, it is envisaged that thrusters, such as azimuthing thrusters with 'L' or 'Z' drive arrangements, may be used which allow propeller units to protrude vertically through the hulls 21*a* and 21*b*.

Figure 9:
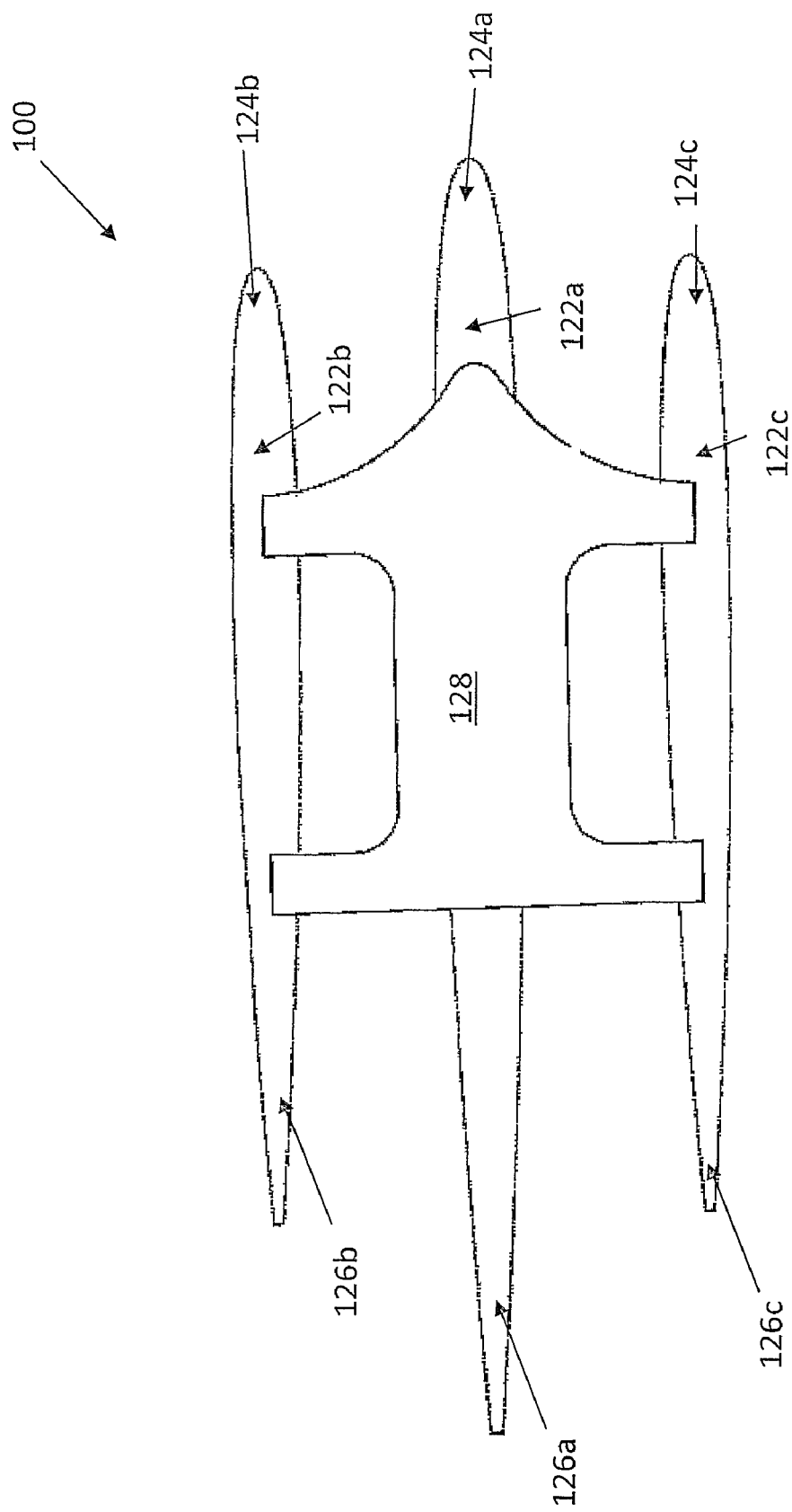
FIG. 9 is a plan view of trimaran vessel including the hulls in FIG. 2.
Figure 10:
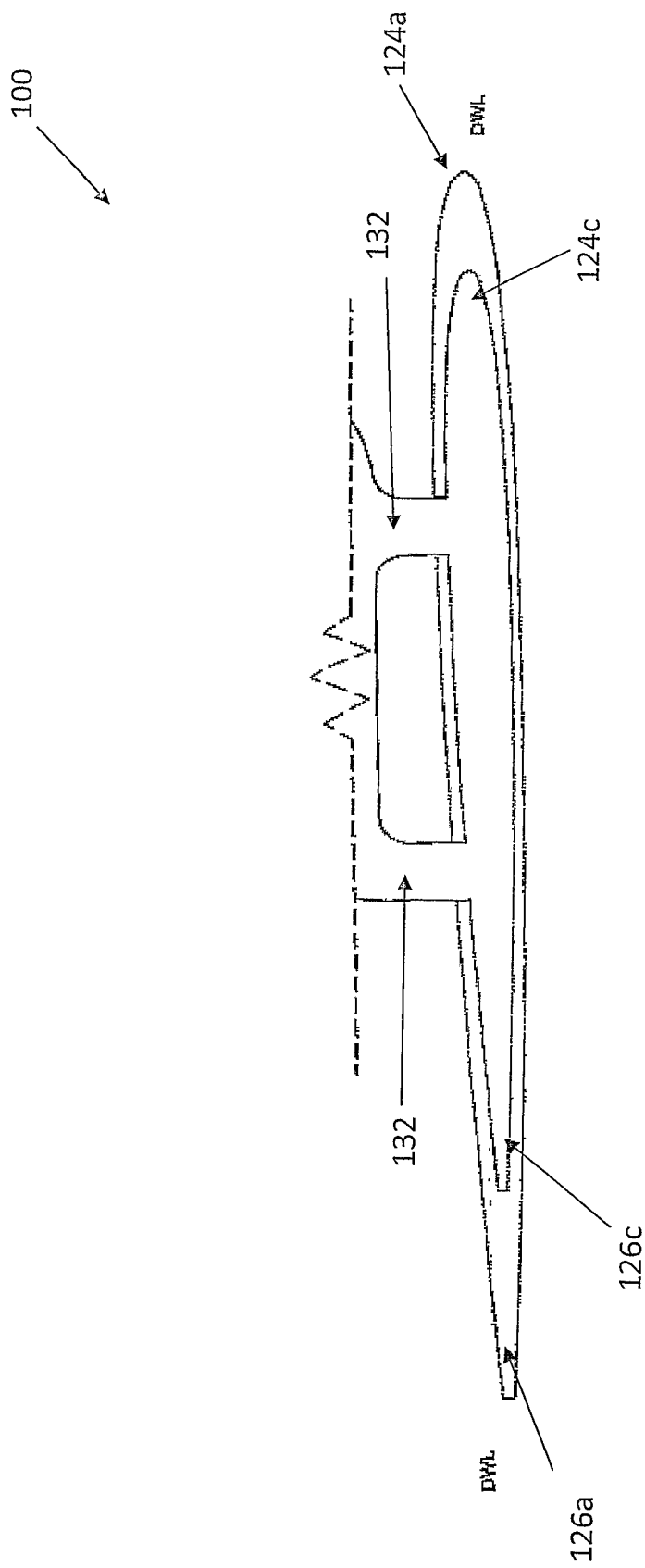
FIG. 10 is side view of the trimaran in FIG. 9.

Similarly, a trimaran 100 is shown in FIGS. 9 and 10 including three hulls 1 (shown in FIG. 2) and marked in FIGS. 9 and 10 as 121*a* and 121*b*. A separate pod 128 is positioned between two hulls 211*a* and 121*b* above the waterline, and connected by struts 132. The struts 132 and pod 128 prevent water being trapped between the hulls, reducing slamming loads caused by water or air passing between two perpendicular hulls 121a and 121b. Any form of propulsion can be used in conjunction with the trimaran 100.

The pod 128 can also be used to counteract and steady the vessel 100 if it pushed beyond its limits and driven into the base of a swell at high speeds. Also a conventional straight shaft arrangement could be utilized whereby the propeller is protected by a skeg attached to the lower portion of the hull. For larger vessels, it is envisaged that thrusters, such as azimuthing thrusters with 'L' or 'Z' drive arrangements, may be used which allow propeller units to protrude vertically through the hulls 121a and 121b.

The hull 1 provides exceptional efficiency throughout the vessel's 10, 100 operating range, including both frictional resistance dominated low speeds and wave-making resistance dominated high speeds. The hull 1 also exhibits exceptional seakeeping characteristics due to the second buoyancy portion designed to reduce slamming and minimise pitching compared with a conventional vessel, providing a smoother ride and improved performance in a seaway. The hull 1 utilises a foil shape when in use.

Figure 13A:
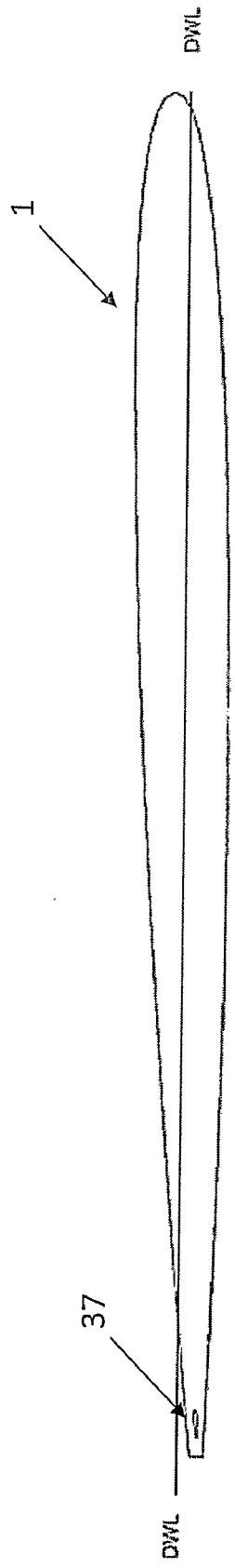
FIG. 13a is a side view of the hull shown in FIG. 1 including a stern foil.
Figure 13B:
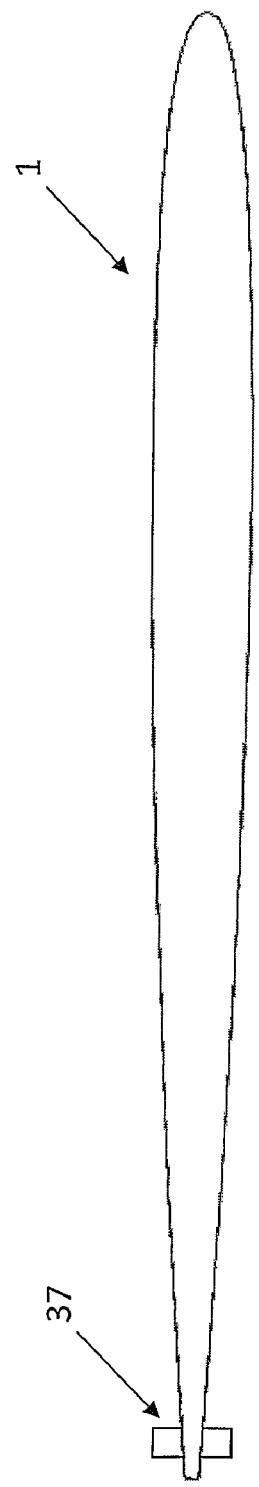
FIG. 13b is a plan view of the hull shown in FIG. 1 including a stern foil.
Figure 14A:
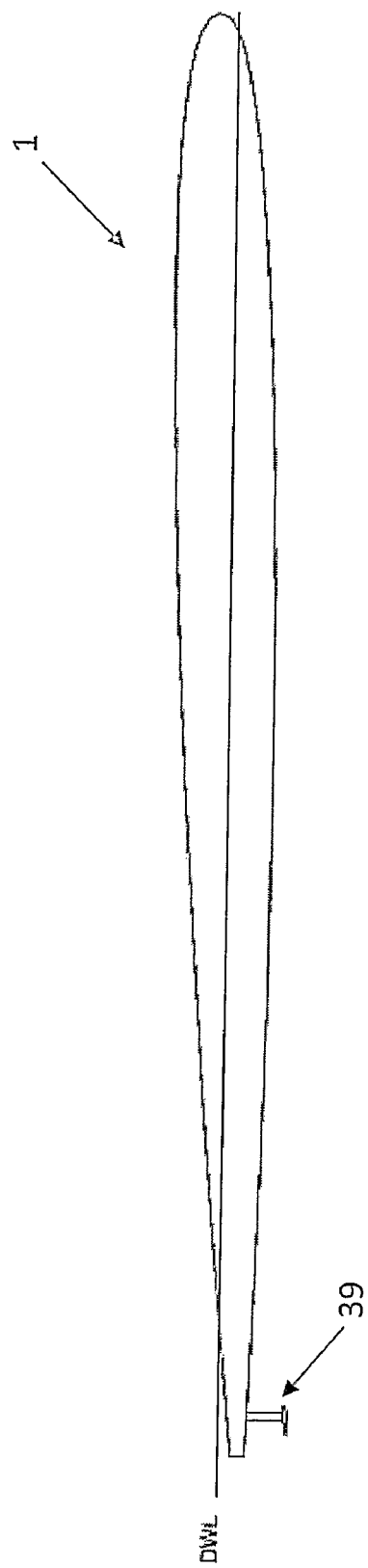
FIG. 14a is a side view of the hull shown in FIG. 1 including a T-foil.
Figure 14B:
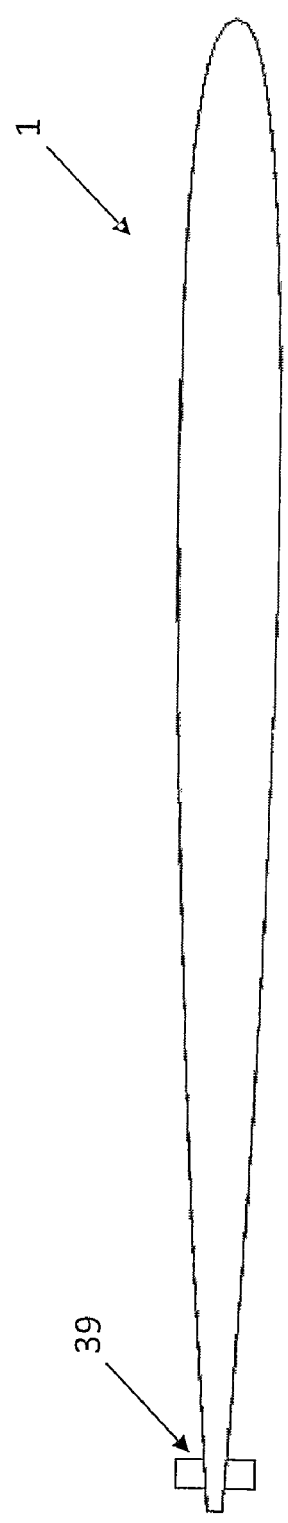
FIG. 14b is a plan view of the hull shown in FIG. 1 including a T-foil.

The hull 1 may includes stern foils 37 located on the centreline as shown in FIG. 13a. The foils are generally rectangular or elliptical in profile view, but it will be appreciated that any suitable shape can be used. A further foil is shown in FIG. 14a. The T-foil 39 is located under the hull.

FIG. 15 shows a hull 501 according to the present invention being used in a monohull application. The sailing vessel 500 includes a rudder 502, keel 503, mast 505, and sails 504. Because of the cylindrical hull the weight of the keel provides the stability to the hull 501 and keeps it upright.

Through the centre of the hull 501 the cross-section changes (as shown in FIGS. 15b and 15c) to provide for accommodation space and cockpit space in this region. Unlike the catamaran and trimaran shown in FIGS. 8 and 8, the hull 501 is unable to carry the accommodation up off the hull on struts. It will also be appreciated that a multihull vessel could be build with hulls similar to those shown in FIG. 15a.

While we have described herein a particular embodiment of a hull for a marine vessel, it is further envisaged that other embodiments of the invention could exhibit any number and combination of any one of the features previously described. However, it is to be understood that any variations and modifications can be made without departing from the spirit and scope thereof as defined in the following claims.

The invention claimed is:

1. A hull for a marine vessel, the hull comprising:
one or more elongated bodies each having a longitudinal vertical cross section that tapers substantially continuously outwardly from a foremost location to a middle section with a maximum depth and tapers substantially continuously inwardly from the middle section toward aft of the elongated body such that the aft of the body is significantly reduced in profile with respect to the maximum depth; and
at least a foremost section having an enclosed structure with the elongated body having a center of buoyancy in a forward half of the elongated body;
wherein the one or more elongated bodies is surface acting so that the buoyancy provides a water line intersecting substantially along a length of the one or more hulls and that any displacement of the water to submerge a part of the one or more elongated bodies is offset by a reserve buoyancy provided by another part of the one or more elongated bodies previously above the water line,
and wherein the one or more elongated bodies has a transverse cross section that tapers substantially continuously outwardly from a foremost location to a middle section with a maximum sectional area and tapers substantially continuously inwardly from the middle section toward the aft such that the aft of the body is significantly reduced in profile with respect to the maximum sectional area.

2. The hull for a marine vessel of claim 1 wherein the elongate body having a middle section forward of the middle of the length of the hull.

3. The hull for a marine vessel of claim 1 wherein the elongate body having a longitudinal, vertical wing-like cross section forming a foil.

4. The hull for a marine vessel of claim 1 wherein the transverse cross sectional area increases rapidly longitudinally to a single maximum transverse cross sectional area and decreases aft at a substantially reduced rate.

5. A surface acting hull for a marine vessel, the hull comprising:
an elongate body having a first section, which carries a bow of the hull, and a second section which carries a stern of the hull, the elongate body is movable between a floating position at which the elongate body is resting on a body of water, and a submerged position at which the elongate body is moved in a substantially horizontal orientation vertically into the body of water from the floating position to a position at which an upper end of the elongate body is adjacent a surface of the body of water; wherein:
the first section is profiled to displace a first volume of water, and the second section is profiled to displace a second volume of water which is less than the first volume of water so that the center of buoyancy of the elongate body, in the floating position, is in the first half;
the elongate body, in the floating position, has a reserve buoyancy which is positioned above a water line of the body of water and which has a stern end which moves towards the bow as the elongate body is moved to the submerged position;
a surface area of the reserve buoyancy is shortened towards the bow through movement of the stern end towards the bow thereby adjusting, relative to the bow, the extent with which a remaining volume of the reserve buoyancy extends from the bow thereby to adjust an amount of lift generated by the reserve buoyancy when the elongate body is moved to the submerged position; and
the center of buoyancy moves towards the bow through the repositioning of the reserve buoyancy thereby to adjust a trim of the elongate body.

6. The hull for a marine vessel of claim 5 wherein:
the second section has a length which is greater than a length of the first section; and
the elongate body has a body length such that the elongate body has a ratio of body length to beam which is selected from a range of between 10:1 and 18:1.

7. The surface acting hull for a marine vessel of claim 6 wherein the body length to beam ratio is 13:1.

8. The surface acting hull for a marine vessel of claim 7 wherein:
the hull supports a structure which has a structure length; and
the body length of the hull and is greater than the structure length.

9. The surface acting hull for a marine vessel of claim 5 further comprising one or more elongate bodies; and wherein a displacement of the one or more elongate bodies relative to an overall structural weight of the marine vessel is in a range between 130% and 260%.

10. The surface acting hull for a marine vessel of claim 9 wherein:
the elongate body has a floating buoyancy when in the floating position; and
a portion of the floating buoyancy occupied by the second section is greater than a portion of the floating buoyancy occupied by the first section.

11. The surface acting hull for a marine vessel of claim 10 wherein:
the first section is bulbous;
the second section is conical shaped; and
the stern is substantially submerged when the elongate body is in the floating position.

12. The surface acting hull for a marine vessel of claim 11 wherein the center of buoyancy is positioned, when the elongate body is in the submerged position, a distance from the bow which is in the range of between 35% and 40% of the body length of the elongate body.

13. The surface acting hull for a marine vessel of claim 12 wherein the distance is 37% of the body length of the elongate body.

14. The surface acting hull for a marine vessel of claim 5 wherein:
the hull has a circular cross-section; and
the floating and reserve buoyancies are shaped to provide a bow trim in the range of between 0°-3°.

15. The surface acting hull for a marine vessel of claim 5 wherein:
the profile of the hull is formed such that the remaining volume of reserve buoyancy moves towards the bow; and
a rate of increase in buoyancy, produced through movement of the elongate body from the floating position to the submerged position, decreases as the elongate body is moved to the submerged position due to the movement of the stern end of the reserve buoyancy towards the bow.

16. The surface acting hull for a marine vessel of claim 5 wherein:
the reserve buoyancy has a vertical profile that includes a taper such that buoyancy increases with increasing submersion of the hull; and
the rate of increase in buoyancy decreases when the elongate body is moved to the submerged position.

17. A marine vessel comprising:
propulsion means;
means for controlling the direction of travel of the vessel; and
one or more hulls, each hull comprising:
an elongate body having a first section, which carries a bow of the hull, and a second section which carries a stern of the hull, the elongate body is movable between a floating position at which the elongate body is resting on a body of water, and a submerged position at which the elongate body is moved in a substantially horizontal orientation vertically into the body of water from the floating position to a position at which an upper end of the elongate body is adjacent a surface of the body of water; wherein:
the first section is profiled to displace a first volume of water, and the second section is profiled to displace a second volume of water which is less than the first volume of water so that the center of buoyancy of the elongate body, in the floating position, is in the first half;
the elongate body, in the floating position, has a reserve buoyancy which is positioned above a water line of the body of water and which has a stern end which moves towards the bow as the elongate body is moved to the submerged position;
a surface area of the reserve buoyancy is shortened towards the bow through movement of the stern end towards the bow thereby adjusting, relative to the bow, the extent with which a remaining volume of the reserve buoyancy extends from the bow thereby to adjust an amount of lift generated by the reserve buoyancy when the elongate body is moved to the submerged position; and
the center of buoyancy moves towards the bow through the repositioning of the reserve buoyancy thereby to adjust a trim of the elongate body.

18. The marine vessel of claim 17 further comprising:
a structure for accommodating passengers or cargo; and
support means; wherein:
the support means connects to the structure and to the one or more hulls.

19. The marine vessel of claim 18 wherein:
the support means comprises one or more struts; and
each of the one or more struts is shaped to reduce hydrodynamic resistance imparted when at least part of the one or more struts is submerged.

20. The marine vessel of claim 18 wherein the support means comprises a member defining an enclosed volume that contributes to buoyancy of a respective hull of the one or more hulls when the member is at least partly submerged.

* * * * *